United States Patent [19]

Kaplan et al.

[11] Patent Number: 4,632,547
[45] Date of Patent: Dec. 30, 1986

[54] AUTOCOLLIMATING ALIGNMENT TELESCOPE

[75] Inventors: Irwin Kaplan, East Northport; William B. Schneider, Syosset, both of N.Y.

[73] Assignee: Broomer Research Corporation, Islip, N.Y.

[21] Appl. No.: 774,550

[22] Filed: Sep. 10, 1985

[51] Int. Cl.[4] ............................................. G01C 1/00
[52] U.S. Cl. .................................... 356/247; 350/537
[58] Field of Search ........ 356/247; 350/537, 560–567, 350/569–570

[56] References Cited

U.S. PATENT DOCUMENTS 4,468,119 8/1984 Hamar ............................ 356/247 X Primary Examiner—Eugene R. LaRoche
Assistant Examiner—D. C. Mis
Attorney, Agent, or Firm—Kirschstein, Kirschstein, Ottinger & Israel

[57] ABSTRACT

An autocollimating alignment telescope automatically turns a lamp on in the autocollimating operational mode, and automatically turns the lamp off in the alignment telescope operational mode. The telescope has reticles which are replaceable in the field, as well as eyepiece and lamp housings whose mountings are interchangeable. The telescope also has an assembly for preventing jamming of the traveling lens assembly of the telescope, as well as independently operable coarse and fine adjustments for the traveling lens assembly.

31 Claims, 12 Drawing Figures

AUTOCOLLIMATING ALIGNMENT TELESCOPE

BACKGROUND OF THE INVENTION

1. Field of the Invention

This invention generally relates to autocollimating alignment telescopes and, more particularly, to structural and functional improvements in such telescopes.

2. Description of the Prior Art

An autocollimating alignment telescope integrates an autocollimator and an alignment telescope in a single optical measuring instrument. As is well known, a telescope enables a viewer, looking through an eyepiece which is focused at a focal plane, to see a far-away object whose light is focused at the same focal plane by a stationary objective lens. An alignment telescope includes a reticle located at the focal plane, and a focusing lens which is movable relative to the stationary objective lens. The position of the focusing lens influences the focal length of the objective lens, and focuses the image of the far-away object on the reticle. In a typical application where a plurality of far-away objects are sequentially viewed through the alignment telescope and their respective images focused on the reticle, the objects may be aligned along an optical axis of the alignment telescope, or be arranged in any desired orientation.

With the addition of an autocollimator, light-reflecting surfaces, such as mirrors, on exterior objects can be aligned perpendicularly to the optical axis of the alignment telescope. A collimator simulates a far-away object by generating parallel light rays. More specifically, a light source is located at the focal plane of a stationary objective lens, and diverging light emitted by the light source is converted to parallel light rays by the objective lens. An autocollimator transmits such parallel light rays for reflection onto the exterior mirror, and receives the reflected rays. More specifically, the light source directs the diverging light through a reticle and through the stationary objective lens where it is converted to parallel light rays. The parallel light rays impinge on the exterior mirror which reflects the rays back through the objective lens and focuses the reflected rays onto another reticle which is located at the focal plane of an eyepiece. Thus, a viewer, looking through the eyepiece, can check the angular position in space of the exterior mirror and, hence, of the object on which the mirror is mounted.

Since both the individual autocollimator and the individual alignment telescope utilize some of the same optical components, e.g. a stationary objective lens, an eyepiece, at least one reticle, such components need not be duplicated in an integrated autocollimating alignment telescope, and can be separately used either in the alignment telescope mode of operation, or in the autocollimating mode of operation. The light source, of course, is not needed in the alignment telescope mode. In the autocollimating mode, the movable focusing lens must be held in a fixed position. A beam splitter is typically employed in the autocollimating alignment telescope to provide two optical paths along which the various light rays travel.

Although the known autocollimating alignment telescopes were generally satisfactory for their intended purposes, they have not proven to be altogether convenient to use. For example, the light source, as noted above, has to be energized in the autocollimating mode, but not in the alignment telescope mode. Typically, the light source was energized by electrical power supplied from an electrical outlet and into which an electrical plug was inserted. The plug was mounted at one end of a cable whose other end was either directly connected to the light source, or was connected to the latter through an electrical switch. To energize the light source, the user either had to manually insert the plug into the outlet, or manually flip the switch. To deenergize the light source, the user either had to manually remove the plug from the outlet, or manually flip the switch again. In a typical optical measuring situation where one was required to change often from the alignment telescope mode to the autocollimating mode, and vice versa, it was extremely burdensome to require the user to repeatedly perform the above-described extra manual motions when changing modes.

Furthermore, the known autocollimating alignment telescopes were essentially custom-made instruments and not readily adaptable to different applications. For example, a user would typically advise the instrument manufacturer which of the aforementioned reticles were to be used in the instrument, and the instrument would then be supplied with the reticles permanently and precisely epoxied in place. The user had little recourse if he or she desired to use different reticles, because of their permanent installation. Thus, an instrument might be provided with a dark field reticle, but if a bright field reticle were instead desired, there was no way, short of returning the instrument to the manufacturer for a reworking, that this could be achieved. Similarly, there were reticles with center dots, with concentric circles, or with cross-lines, etc., and once the known instruments were manufactured with one of these types of reticles, the user was compelled to use this reticle type no matter what the particular application.

The known autocollimating alignment telescopes also caused user discomfort in that a user was compelled always to view an object through an eyepiece whose position on the instrument was fixed. The instrument has an elongated barrel extending along a major axis, and the eyepiece was either centered on the major axis so that the user could view the object by positioning his or her eye on the major axis, or the eyepiece was located above, and at a right angle to, the major axis so that the user could view the object by positioning his or her eye above the major axis. The fixed position of the eyepiece meant that the user had to use the instrument by always positioning his or her eye either colinearly or perpendicularly to the major axis. There are optical measurement situations where the user would like the option as to how to position his or her eye, or would like to change the position of his or her eye, but the known instruments do not permit this versatility.

The known autocollimating alignment telescopes also were prone to jamming of, and damage to, the focusing lens when the same was moved inside and along the barrel and struck mechanical stops which defined end-limiting positions for the focusing lens. The focusing lens was moved by a gear drive coupled to a manually-turnable focusing knob. When the focusing lens abutted against either stop in either one of its end-limiting positions, the possibility existed that damage to the focusing lens, or stripping of the gears, or jamming of the focusing lens against the stop could occur, particularly if the user forcefully turned the knob and forced the focusing lens against the stop with a high impact force. Also, the known autocollimating alignment telescopes typically used a gear drive with a single gear ratio, e.g. a predetermined high number of turns of the focusing knob was required to move the focusing lens from one to the other of its end-limiting positions. This was highly undesirable and time consuming.

SUMMARY OF THE INVENTION

1. Objects of the Invention

It is a general object of this invention to overcome the aforementioned drawbacks of the known autocollimating alignment telescopes.

It is another object of this invention to eliminate the prior art requirement for a user to repeatedly perform extra manual motions to energize a light source in the autocollimating mode of operation, and to deenergize the light source in the alignment telescope mode of operation.

It is a further object of this invention to provide an autocollimating alignment telescope which is readily adaptable to different optical measurement applications.

It is still another object of this invention to provide an autocollimating alignment telescope which has reticles which are interchangeable by, and at the option of, the user.

It is yet another object of this invention to provide an autocollimating alignment telescope which has an eyepiece whose position is changeable by, and at the option of, the user.

It is still a further object of this invention to provide an autocollimating alignment telescope which has an eyepiece and a light source whose positions are interchangeable by, and at the option of, the user.

It is another object of this invention to prevent jamming of the focusing lens of an autocollimating alignment telescope against mechanical stops, to prevent damage to the focusing lens, and to prevent stripping of the gears in a gear drive for moving the focusing lens during use.

A further object of this invention is to provide more than one gear ratio for the gear drive for moving the focusing lens to reduce the time and labor involved in moving the focusing lens to a desired position.

Yet another object of this invention is to provide an autocollimating alignment telescope which is convenient to use, compact in construction, versatile, and readily adaptable by the user to different optical measurement applications, all without sacrificing measurement accuracy and precision.

2. Features of the Invention

In keeping with these objects, and others which will become apparent hereinafter, one feature of this invention resides, briefly stated, in an autocollimating alignment telescope which comprises an elongated tubular barrel, stationary objective lens means mounted in the barrel, first reticle means mounted in the barrel away from the objective lens means, and movable focusing lens means mounted in the barrel away from the objective lens means and forming therewith an optical axis. The focusing lens means is axially movable among a broad range of alignment positions and a narrow focused range of collimating positions. In a preferred case, the focused range of collimating positions is adjacent an end-limiting position, and one of the alignment positions is the other end-limiting position. Drive means are operatively coupled to the focusing lens means for axially moving the same, in an alignment telescope mode of operation, to a selected one of the alignment positions in which the focusing lens means and the objective lens means focus light from at least one exterior object onto the first reticle means. Eyepiece means are mounted on the barrel, and are operative for enabling a viewer to view the light focused on the first reticle means in the alignment telescope mode of operation. In this way, the positions of a plurality of exterior objects are focused on the first reticle means, and the exterior objects may be aligned along the optical axis, or may be arranged in any desired orientation.

The telescope further comprises energizable light source means mounted on the barrel and operative, when energized, for emitting light in an autocollimating mode of operation. Second reticle means are mounted on the barrel adjacent the light source means. The drive means are also operative for positioning the focusing lens means in a focused collimating position. Means are further provided for directng light emitted from the energized light source means through the second reticle means, the focusing lens means in the focused collimating position, and the objective lens means to an exterior light-reflecting target which, in turn, relfects the emitted light impinging thereon. At least a portion of the reflected light is focused by the objective lens means and the focusing lens means in the focused collimating position onto the first reticle means where the focused light is viewable in the autocollimating mode of operation. In this way, the angular position in space of the exterior light-reflecting target can be checked.

In accordance with one advantageous feature of this invention, automatic switching means are operatively coupled to the light source means and the focusing lens means. The automatic switching means are operative for automatically energizing the light source means when the focusing lens means has been moved by the drive means to the focused collimating position, and for automatically deenergizing the light source means when the focusing lens means has been moved by the drive means to any one of the alignment positions. Hence, the emitted light is automatically lit during the autocollimating mode of operation and is automatically extinguished during the alignment telescope mode of operation. No longer is it necessary to manually insert or remove an electrical plug into and from an electrical outlet to energize or deenergize a light source. No longer is it necessary to manually actuate or deactuate an electrical switch to energize or deenergize a light source. No extra manual motions on the part of the user are required.

Another advantageous feature of this invention resides in the interchangeability of the reticle means. Whereas, in the prior art, the reticles are permanently epoxied in place, this invention proposes the detachable mounting of the reticles and the substitution of one reticle for another by, and at the option of, the user. The first reticle means may include a set of first reticle plates, e.g. of the type etched with a center dot, concentric circles, cross-lines, etc., and the second reticle means may include a set of second reticle plates, e.g. of the type etched with a dark field, a bright field, etc. This invention enables the user to select which of the first or second reticle plates he or she wishes to use for a particular application. No longer is it necessary to rely on custom-made, non-changeable instruments wherein the reticles are permanently installed.

Still another advantageous feature of this invention is embodied in user comfort and, more particularly, in providing the user with the option of positioning his or her eye either colinearly on, or perpendicularly to, the major axis of the instrument. The location of the eyepiece means may be changed by, and at the option of, the user. No longer is it necessary to compel a user to position his or her eye in only one way. Related to this latter feature is the aspect of readily interchanging the position of the eyepiece means with the light source means.

Yet another aspect of this invention relates to the drive means which, in an advantageous construction, includes a manually-turnable handle and a transmission means between the handle and the movable focusing lens means. The transmission means has a coarse adjustment means for moving the focusing lens means through a relatively greater distance along the optical axis for each turn of the handle, and a fine adjustment means for moving the focusing lens means through a relatively smaller distance along the optical axis for each turn of the handle. This reduces the time necessary to focus the focusing lens means, and enables the user to readily change from the coarse to the fine adjustment means, and vice versa, as required.

Anti-jamming means are also provided for preventing the focusing lens means from jamming in either one of the aforementioned end-limiting positions. In a preferred embodiment, a slip clutch is provided in the transmission means, and reliably prevents such jamming, or damage to the focusing lens means, or stripping of any gears in the transmission means.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
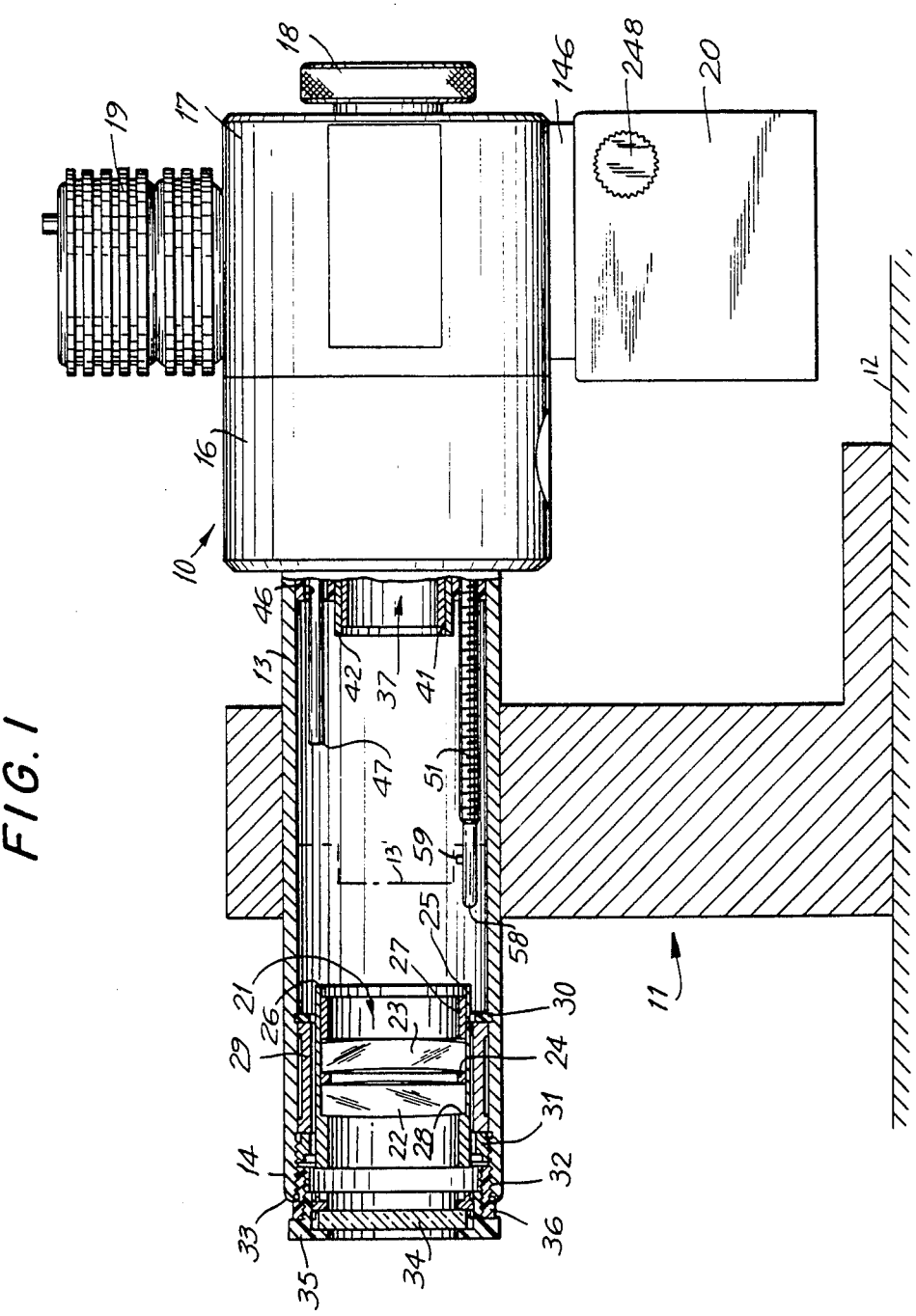
FIG. 1 is a side elevational view, partly in section, of an autocollimating alignment telescope in accordance with this invention.

Referring now to the drawings, reference numeral 10 generally identifies an autocollimating alignment telescope or instrument mounted on a stand 11 above a generally horizontal support surface 12. The instrument 10 includes a main tube or barrel 13 elongated along a longitudinal axis and having a front end region 14 and a rear end region 15 (see FIG. 2). An annular collar 16 surrounds and is mounted on the rear end region 15. A generally cup-shaped cover 17 is mounted axially adjacent the collar 16. As shown in FIG. 1, an eyepiece assembly 18 is mounted on the cover and extends rearwardly thereof. A light source assembly 19 is mounted above the cover and extends upwardly at a right angle to the longitudinal axis. A power supply 20 is mounted below the cover and extends downwardly at a right angle to the longitudinal axis underneath the cover 17.

A stationary objective lens cell assembly 21 is mounted within the barrel 13 at the front end region 14. The objective assembly 21 includes a pair of objective lens elements 22, 23 separated by a spacer 24 and fixedly positioned within a bore 25 of an inner tubular sleeve 26 by a split retaining ring 27. The ring 27 urges the elements 22, 23 against a shoulder 28 of the sleeve 26. An outer tubular sleeve 29 is locked by set screws and adhesive to the inner sleeve 26. A C-ring 30 within the barrel abuts against a rear end region of the objective assembly 21 to fix the same in place. A threaded lock ring 31 threadedly engages an interior thread 32 formed at the front end region 14 within the barrel, and abuts against a front end region of the objective assembly 21 to fix the same in place.

The objective assembly 21 is axially spaced inwardly of the axial end face 33 of the barrel to permit a light-transmissive element 34 to be mounted in an overlying relationship with the end face 33. The element 34 may be a protective window, color filter or the like, and is held between outer and inner mounting rings 35, 36, the inner ring 36 being threadedly engageable with the interior thread 32 which extends to the end face 33. As described thus far, the stationary objective lens assembly 21 is stationarily mounted at the front end region of the barrel, and may comprise any number of objective lens elements, two of the latter being preferred for aberration correction.

Figure 2:
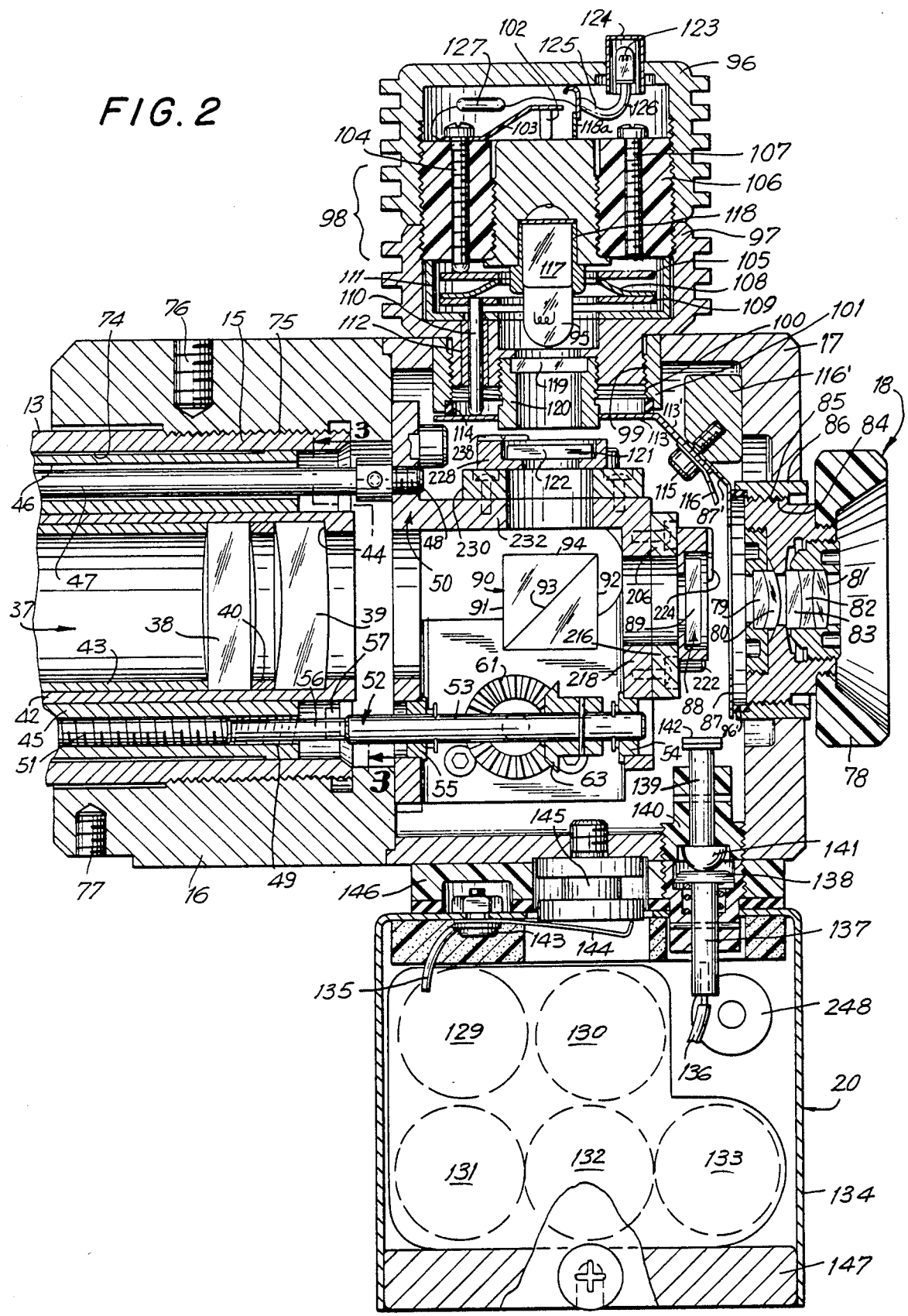
FIG. 2 is an enlarged sectional view of the rear of the telescope shown in FIG. 1.

A movable focusing lens cell assembly 37 is mounted within the barrel 13 for longitudinal movement between the end-limiting positions shown in solid lines in FIGS. 1 and 2 and by dashed lines 13' in FIG. 1. The focusing assembly 37 includes a pair of focusing lens elements 38, 39 (see FIG. 2) separated by a spacer 40 and fixedly positioned within a bore 41 of an inner tubular sleeve 42 by a split retaining ring 43. The ring 43 urges the elements 38, 39 against a shoulder 44 of the sleeve 42. An outer tubular sleeve 45 is adhered at its inner circumferential surface to the exterior circumferential surface of the inner sleeve 42, and is jointly movable with the same.

A guide passage 46 extends longitudinally through the outer sleeve 45 and, with slight clearance, slidably receives a guide shaft 47 which is stationarily mounted at its rear end 48 by being threaded into a rear support 50. The guide shaft 47 is situated above the longitudinal axis, and extends through the guide passage 46 and past the front end of the outer sleeve 45.

A threaded passage 49 also extends longitudinally through the outer sleeve, and receives a drive shaft 52. The drive shaft 52 has a rear portion 53 journaled for rotation at spaced-apart bearings 54, 55, a reduced diameter portion 56 on which a rear stop pin 57 extends radially outwardly, a threaded portion 51 which threadedly engages the threaded passage 49, and an end portion 58 (see FIG. 1) on which a front stop pin 59 extends radially outwardly. The drive shaft 52 is situated below the longitudinal axis and extends through the threaded passage 49 and past the front end of the outer sleeve.

As described in greater detail below in connection with FIG. 8, a manually-turnable handle or rotary focusing knob 60 extends laterally outwardly of the cover 17, and is operatively connected to a first bevel gear 61 through a transmission assembly 62. As best shown in FIG. 2, the gear 61 meshes with a second bevel gear 63 which is turnable about an axis perpendicular to that of the first bevel gear 61 and which is pinned to the rear portion 53 of the drive shaft 52 for joint movement therewith. Upon turning the knob 60 in either circumferential direction about its axis of rotation, both gears 61, 63 turn about their respective axes, and the drive shaft 52 is caused to rotate about a drive axis which extends along its length. As the drive shaft 52 rotates, the threaded portion 51 acts as a lead screw and causes the focusing assembly 37 to move axially within and along the barrel, either forwardly or rearwardly, depending upon the direction in which the knob 60 was turned. The stationary guide shaft 47 prevents the focusing assembly from turning about the drive axis, and permits the axial movement of the focusing assembly.

Figure 3:
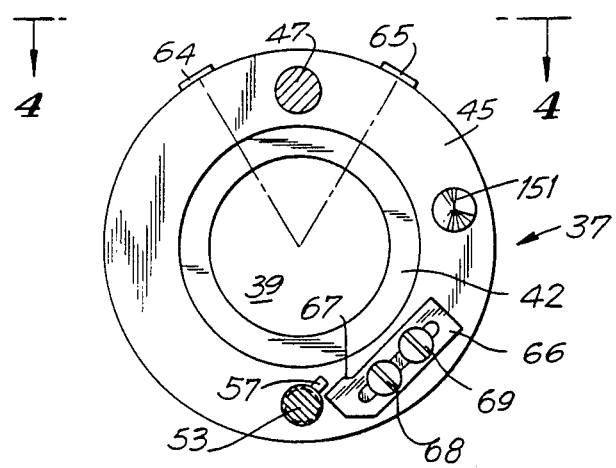
FIG. 3 is a sectional view taken on line 3—3 of FIG. 2.
Figure 4:
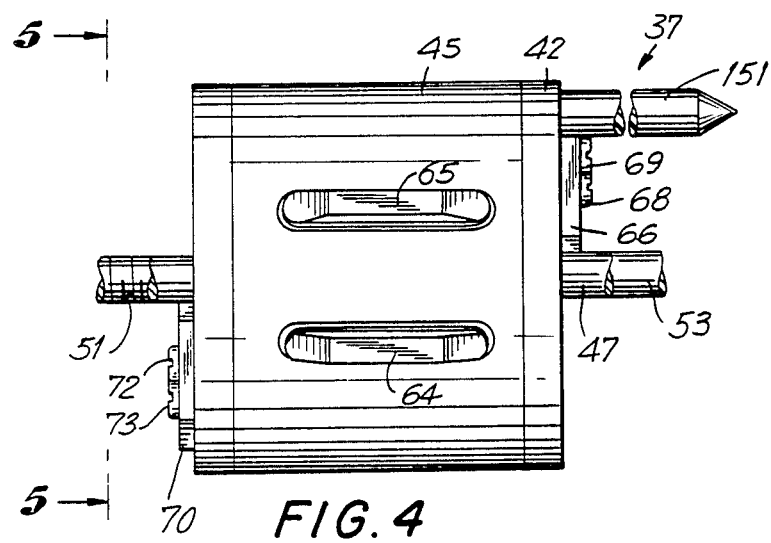
FIG. 4 is a top plan view taken on line 4—4 of FIG. 3.
Figure 5:
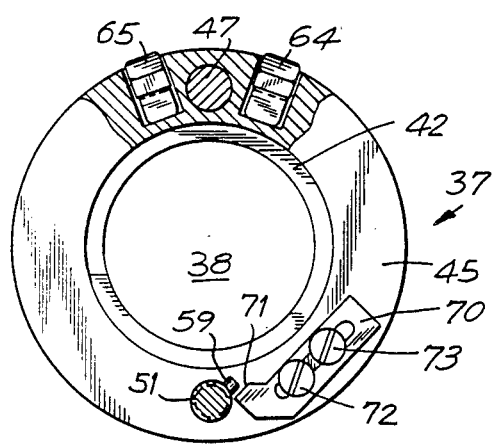
FIG. 5 is a side view taken on line 5—5 of FIG. 4.

Turning now to FIGS. 3, 4 and 5, which show the focusing assembly 37 in isolation, reference numerals 64, 65 identify a pair of metal spring-biased plastic ramps which bear on and ride along the interior circumferential surface of the barrel 13 to reduce friction and gain stability during the axial movement of the focusing assembly. A rear adjustable bracket 66 having a stop surface 67 is adjustably mounted by screws 68, 69 on the rear end face of the outer sleeve 45. As shown in FIG. 3, the rear stop pin 57 abuts against the stop surface 67 and denotes the rearmost end-limiting position to which the focusing assembly can be moved. A front adjustable bracket 70 having a stop surface 71 is adjustably mounted by screws 72, 73 on the front end face of the outer sleeve 45. As shown in FIG. 5, the front stop pin 59 abuts against the stop surface 71 and denotes the forwardmost end-limiting position to which the focusing assembly can be moved.

Returning to FIG. 2, the ramps 64, 65 slide along the interior circumferential surface 74 of the barrel 13. The rear end region 15 of the barrel has an exterior thread 75 which engages an interior thread within the collar 16. The collar 16 is adhered in place at the rear of the barrel 13. Accessory screws 76, 77 are mounted in radially-extending bores in the collar, and the removal of the accessory screws permits accessories, e.g. a roll unit, a stand, etc. to be mounted to the instrument.

As described thus far, the focusing assembly 37 is movable closer to and further from the stationary objective assembly 21, and may comprise any number of focusing lens elements, two of the latter being preferred for aberration correction. The four lenses 22, 23, 38, 39 form an optical train having an optical axis which ideally is coincident with the longitudinal axis of the barrel 13.

The eyepiece assembly 18 includes a multi-partite eyepiece housing 78 in which a doublet consisting of a pair of lenses 79, 80 and a triplet consisting of three lenses 81, 82, 83 are received and centered on the optical axis. The housing 78 has an exterior thread 84 which threadedly engages an interior thread 85 of a bushing 86 fixed to the rear of the cover 17. An annular electrically-insulating spacer 86' and an annular electrically-conducting ring 87 having an integral tab 87' are located at the interior axial end of the bushing 86, for a purpose as described below. A reticle assembly 88 including a reticle 89 is mounted on the rear support 50 so that the reticle 89 is precisely positioned at the focal plane of the compound lens eyepiece assembly. A beam-splitting prism 90 is also mounted on the rear support 50. Light impinging on either one of the exterior surfaces 91, 92 of the prism 90 is transmitted to the interior inclined surface 93 where a portion of the light is transmitted to the other one of the exterior surfaces 92, 91 for transmission along the optical axis (hereinafter "major axis"), and where the remaining portion of the light is reflected along a transverse axis (hereinafter "minor axis") which is perpendicular to the major axis.

As described thus far, the instrument 10 can be used as an alignment telescope. Light rays emitted from a succession of exterior far-away objects or targets pass through the stationary objective lens assembly 21 and the focusing lens assembly 37, the latter having been moved by manual turning of the focusing knob 60, along the major axis through the prism 90 toward the reticle 89 until the respective image is focused on the reticle 89, where the focused image is viewed by a user looking into the eyepiece assembly 18. This is the alignment telescope mode of operation, wherein the positions of the targets can be aligned or arranged in any desired orientation.

To use the instrument as an autocollimator, the light source assembly 19 must be energized when the focusing lens assembly 37 is in a known, focused position relative to the stationary objective lens assembly 21. The focused position lies in a narrow range, e.g. on the order of 0.050 inches, of collimating positions. The light source assembly 19 includes a low voltage (e.g. 6 v DC) bulb 95 mounted between an upper bulb housing part 96 and a lower bulb housing part 97, the two housing parts 96, 97 constituting a light source housing 98 having an exterior thread 99 which threadedly engages an interior thread 100 of a bushing 101 fixed to the upper wall of the cover 17. It will be noted from FIG. 2 that bushing 101 is centered on the minor axis, whereas bushing 86 is centered on the major axis. Also, exterior threads 84, 99 and interior threads 85, 100 all have the same pitch so that the light source housing 98 and the eyepiece housing 78 can be interchanged in position, if so desired.

The bulb 95 has a positive rear conductive terminal 102 engaged by one end of an offset conductive spring 103 whose other end is captured under the head of a conductive screw 104 whose shaft extends through an insulating lamp socket holder 106 into contact with a conductive washer 105 located underneath the holder 106. The washer 105 is vertically juxtaposed with another conductive washer 109, and a spring washer 108 is positioned between the conductive washers 105, 109 to make a resilient electromechanical contact therewith. A positive probe 110 extends from the washer 109 through an opening in a cup-shaped insulated base 111, and through an insulated sleeve 112 and past the same to contact a conductive ring 113 having an integral tab 113'. An annular insulating spacer 114 is located between the bushing 101 and the ring 113.

The tabs 87', 113' overlap each other and are fastened together by a fastener 115 which is threaded into an insulating block 116' within the cover 17. An electrical wire 116 (broken-away in FIG. 2, but shown completely in FIG. 11) is operatively connected to a positive terminal of the power supply assembly 20 which is connected to the fastener 115. A positive electrical path is thus formed from the wire 116 and successively through the tab 113', ring 113, probe 110, washers 109, 108, 105, screw 104, spring 103 and positive terminal 102. The negative or return electrical path is formed as follows: The bulb 95 has a negative jacket terminal 117 receivable in a bulb socket 118 which, in turn, is mounted within a central part of the holder 106. A rear extension 118a makes electrical contact with the upper wall of the upper housing part 96. The upper and lower housing parts 96, 97, as well as the cover 17, the collar 16, the barrel 13 and all exterior surfaces of the instrument are negatively grounded.

A light diffuser or filter 119 is mounted adjacent the bulb 95 in a tube 120 having a central passage through which the bulb may project its light along the minor axis en route to a reticle assembly 121 having a reticle 122. The light passing along the minor axis through the reticle 122 impinges on upper exterior surface 94 of the prism 90, and a portion of this light is reflected along the major axis through the focusing assembly 37 and the objective assembly 21.

The light source assembly 19 further includes a light emitting diode 123 mounted in a shield 124 on the upper wall of the housing part 96. The diode 123 has one lead 125 connected to the grounded rear extension 118a, and another lead 126 connected through a resistor 127 to the other end of the offset spring 103. Whenever the bulb 95 is lit, so is the diode 123 whose exterior location serves as a prominent visual indicator.

The bulb 95 is energized by a power supply assembly 20 which, as shown in FIG. 2, includes a set of regular, or preferably rechargeable, batteries 129, 130, 131, 132, 133 mounted within a casing 134 below the cover 17. Each battery is rated at 1.5 v DC and together they supply about 7.5 v DC to energize the bulb 95. The batteries are interconnected and have an output negative or grounding wire 135 and an output positive wire 136. The positive wire 136 is connected to a conductive mounting post 137 having a flat head 138 facing the exterior of the casing 134. The post 137 is resiliently mounted for slight movement relative to the casing 134. A conductive power supply post 139 having a rounded head 141 is fixedly mounted on a threaded insulating inset 140 which, in turn, is mounted on the cover. When the casing 134 is mounted on the cover, the rounded head 139 engages the flat head 138, the latter giving way to insure a good electromechanical contact therewith. The inner end of the power supply post 139 is in resilient contact with a spring contact 142, further details of which are discussed below in connection with FIG. 7. As for the negative wire 135, it is connected by a fastener 143 to one end of a leaf spring 144 whose other end resiliently presses against a grounded conductive fitting 145 which is threaded into the cover in the mounted position of the casing. A saddle 146 is located between the underside of the cover 17 and the top of the casing 134. A base 147 closes the battery compartment.

Figure 6:
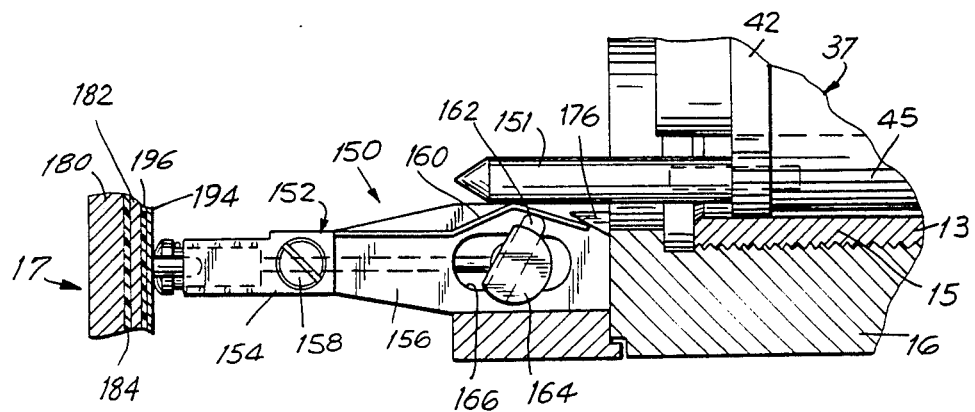
FIG. 6 is an enlarged top plan view of the automatic switching assembly of the telescope of FIG. 1 shown in the autocollimating mode of operation.
Figure 7:
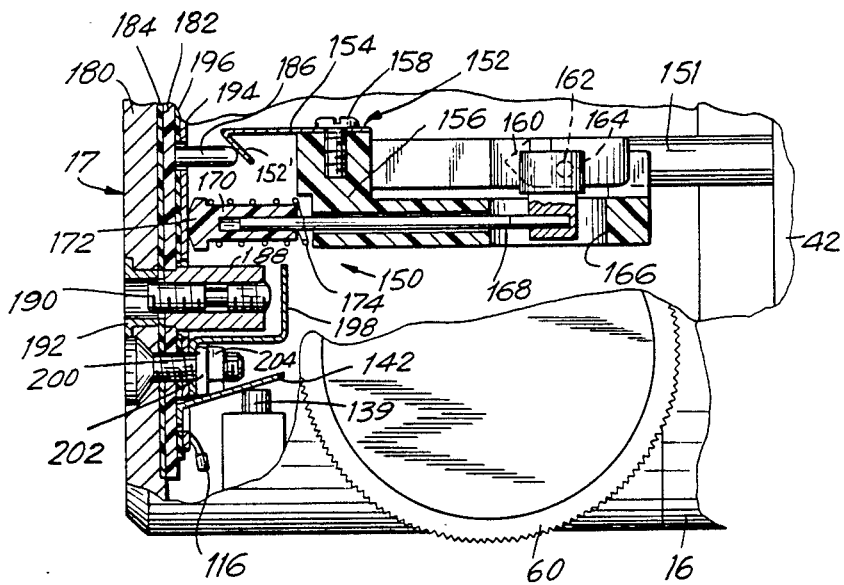
FIG. 7 is a side view of the automatic switching assembly of FIG. 6, with parts of the telescope shown broken away.

As described thus far, the bulb 95 is to be energized in the autocollimating mode of operation by electrical current flowing through the wire 116 located within the cover 17, and this electrical current is supplied by the power supply post 139 which is likewise located inside cover 17. An automatic switching assembly 150, as best shown in FIGS. 6 and 7, is located within the cover and intermediate the power supply post 139 and the wire 116. The switching assembly 150 is operative for automatically energizing the bulb 95 when the focusing lens assembly 37 is in the focused collimating position, which is advantageously near the rear of the range of axial movement of the focusing assembly 37, and for automatically deenergizing the bulb 95 when the focusing lens assembly 37 is at any alignment position within the range of its axial movement. Thus, the light emitted by the bulb 95 is automatically lit and extinguished during the autocollimating and alignment telescope modes of operation, respectively, without requiring any extra manual motions on the part of the user.

As shown in FIG. 6, a pusher rod 151 is threadedly mounted in, and extends rearwardly of, the rear of the focusing lens assembly 37. The rod 151 extends in a generally axial direction and is jointly movable with the focusing lens assembly 37. The rod 151 is constituted of electrically insulating material and has a pointed end facing the cover 17.

The switching assembly 150 further includes a first switching member 152 having a rear probe-contacting portion 152', an intermediate mounting portion 154 mounted on a switch support 156 by means of screw 158, and a front rod-contacting portion 160. The rod-contacting portion is a cantilevered leaf spring and has a movable free end. The switching assembly 150 also includes a second switching member 162 fashioned as a set screw threaded into a block 164. The block 164 extends downwardly through an elongated slot 166, and a support shaft 168 has one end fitted in the block 164 and another end fitted into a contact post 170 having a contact head 172. A coil spring 174 is located between the contact head 172 and the switch support 156. An abutment 176 projects out of the rear of the collar 16 adjacent the free end of the rod-contacting portion 160. As will be described in greater detail below, when the cover 17 is mounted on the rear of the instrument 10, the rear wall 180 of the cover bears against the resiliently mounted contact post 170 and, in turn, pushes the block 164 through the intermediary of the shaft 168 lengthwise of the slot 166 and positions the second switching member 162 to a predetermined open position in which the second switching member 162 is spaced at a distance from the first switching member 152. In this open position, the first switching member 152, due to its own inherent resilience, maintains itself out of electromechanical contact with the second switching member. The abutment 176 insures that the first switching member will not move itself too far from the second switching member. This open position of the switching assembly 150 prevails at all times that the focusing lens assembly 37 is being used in the alignment telescope mode of operation. However, once the focusing lens assembly 37 has been moved to its collimating position, as shown in FIG. 6, the rod 151 deflects the first switching member 152 and, more particularly, the free end portion 160 into electromechanical contact with the second switching member 162, thereby defining a closed position for the switching assembly 150. The movement of the free end portion 160 into and out of contact with the second switching member 162 respectively permits or interrupts the flow of electrical current to the bulb 95, as hereinafter described.

Figure 11:
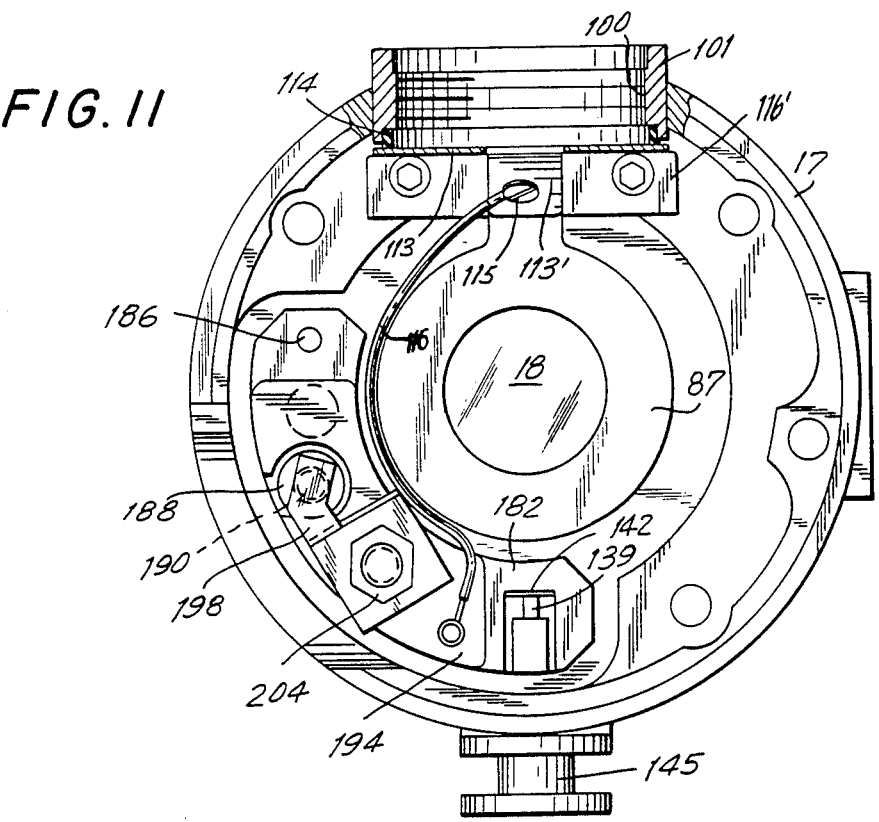
FIG. 11 is a view looking into a cover removed from the rear of the telescope of FIG. 1.

As shown in FIGS. 7 and 11, the aforementioned power supply post 139 makes contact with the spring contact 142 and, in fact, partially deflects the same to insure a good interconnection. The spring contact 142 is soldered to one end of a curved conductive power supply plate 182 which is insulated from the rear wall 180 of the cover 17 by a curved insulating spacer 184. At the other end of the power supply plate 182 is a projecting conductive probe 186. Intermediate the ends of the plate 182 is a conductive tower 188 having an internally threaded bore in which a screw 190 is threadedly received. An insulating flanged washer 192 is fitted into the rear wall 180 at the outer end of the tower 188.

As also shown in FIGS. 7 and 11, the aforementioned wire 116 is soldered to one end of another curved conductive bearing plate 194 which is insulated from the conductive plate 182 by a curved insulating spacer 196. Also soldered to the bearing plate 194 is a standoff 198 which has an end portion which overlies the bore in the tower 188. A threaded stud 200 extends through the plates 182, 194, the spacers 184, 196 and the standoff 198. An insulating washer 202 and a metal nut 204 are employed to fixedly maintain the plates 182, 194, spacers 184, 196 and standoff 198 in the proper mutual orientation.

Hence, once the cover 17 is mounted on the instrument, the probe 186 engages the rear rod-contacting portion 152' and, at the same time, the bearing plate 194 engages the contact head 172 of the contact post. An electrical circuit path from the power supply assembly 20 to the bulb 95 is formed as follows: The positive wire 136 of the power supply supplies electrical current to the power supply post 139 which, in turn, is successively electrically connected to the spring contact 142, the probe 186, the rear rod-contacting portion 152', the first switching member 152 and, if the automatic switching assembly 150 is in the aforementioned closed position, the second switching member 162, the block 164, the shaft 168, the contact post 170, the bearing plate 194 and the electrical wire 116 which, as previously described, is electrically connected to the bulb 95. The electrical current is returned through the grounded exterior parts of the instrument.

Thus, when the switching assembly 150 is closed, which only occurs when the focusing assembly 37 is in the focused collimating position, a complete electrical path is automatically formed from the power supply 20 to the light source assembly 19, and the bulb 95 and the indicator diode 123 are simultaneously lit. In this auto-collimating mode of operation, the bulb 95 projects its diverging light rays along the minor axis through the reticle 122 onto the upper exterior surface 94 of the prism 90, and at least a portion of this light is reflected at the interior inclined surface 93 along the major axis through the focusing lens assembly 37 in its focused collimating position and through the stationary lens assembly 21 as collimated light rays out of the barrel 13 for impingement on an exterior light-reflecting target. The incident collimated light is reflected back through the stationary lens assembly 21 and the focusing lens assembly 37 along the major axis, and at least a portion of the reflected light passes successively through the surfaces 91, 93, 92, and the image of the exterior target is focused on the reticle 89 where the same can be viewed by a user looking through the eyepiece 18. In this way, the angular position of the exterior target can be measured.

In another operational mode, it is desirable to maintain the bulb 95 energized at all times, even when the focusing lens assembly 37 is in any of its alignment telescope positions. In this mode, the automatic switching assembly 150 may be bypassed by short-circuiting the first and second switching members 152, 162. This is conveniently achieved by advancing the screw 190 along the bore in the tower 188 until the screw engages the portion of the standoff 198 overlying the tower bore. When such engagement is made, the power supply plate 182 is electrically connected to the bearing plate 194, and the first and second switching members are shunted. The aforementioned insulating flanged washer 192 insures that the power supply plate 182 is not accidentally shorted to the grounded rear wall 180 of the cover 17 during the advancement of the screw 190 if a conductive tool is inserted into the tower bore and turned to cause said advancement.

Another advantageous feature is embodied in the interchangeability of either one or both of the reticles 89, 122. In an optical metrology instrument of the type described herein, each reticle must be positioned at a predetermined precise location, or else measurement accuracy will be lost. In instrument 10, each reticle must be positioned within about 2.5 microns of its ideal location. This is why prior art instruments typically had their reticles epoxied into place. It simply was not possible to readily replace reticles, and certainly not in the field, within such tight tolerances. This invention, however, permits such field replacement.

Figure 9:
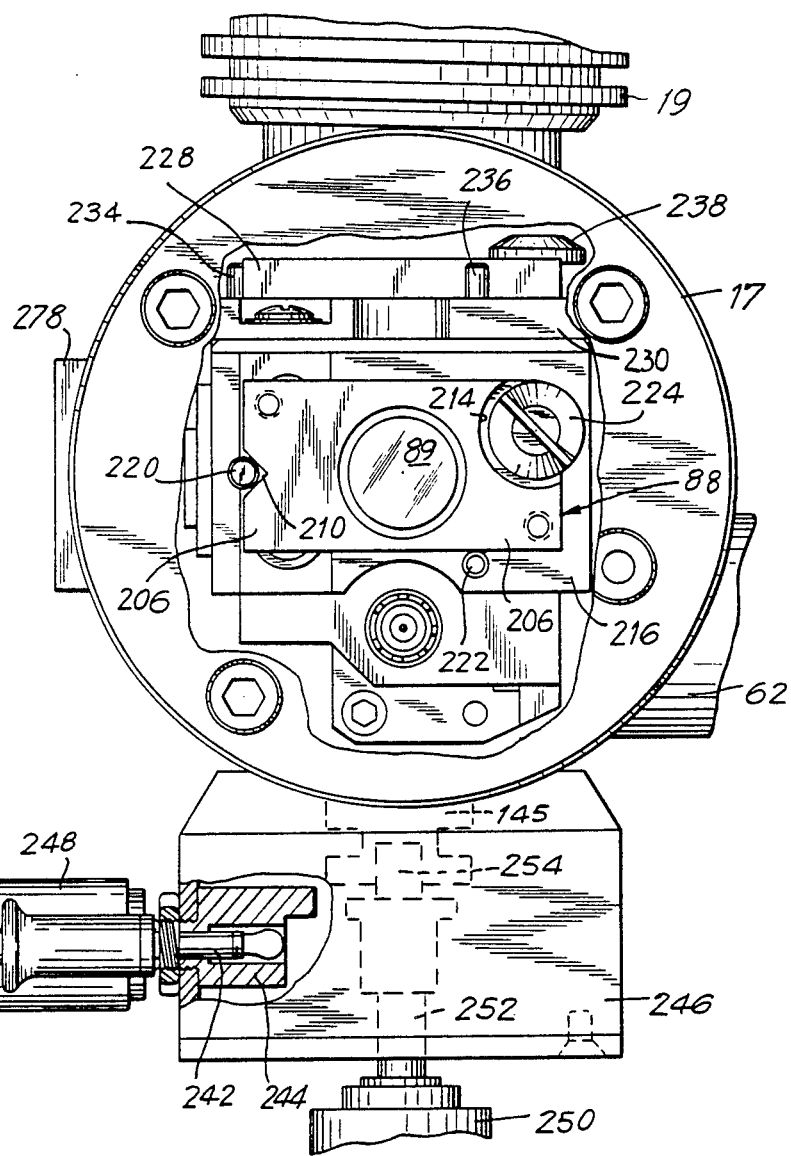
FIG. 9 is a view analogous to FIG. 8, showing another embodiment of a power supply.
Figure 10:
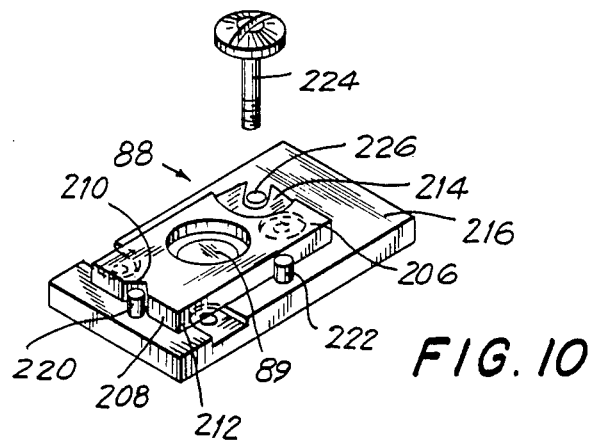
FIG. 10 is an exploded perspective view of a reticle assembly in accordance with this invention.

Thus, as shown in FIG. 9, and in isolation in FIG. 10, reticle 89 of reticle assembly 88 is a light-transmissive element with markings preferably etched thereon, and is mounted in a bore of a rectangular reticle carrier plate 206. The reticle plate 206 has one side 208 which is notched at 210, and another side 212 at right angles to the one side 208. A semicircular cutout 214 is formed at a corner of the reticle plate 206. The reticle plate 206 is, in turn, supported on a rectangular support or pin plate 216 which, in turn, is mounted by means of threaded fasteners on a rear wall 218 of the rear support 50 (see, e.g., FIG. 2). The rear wall 218 and the pin plate 216 have central aligned openings to permit light to pass therethrough along the major axis. The pin plate 216 has a pair of cylindrical locating pins 220, 222 mounted thereon. Each pin 220, 222 has a diameter which is held to an exacting, tight tolerance, and is elongated to be extremely perpendicular to the pin plate 216.

Reticle assembly 88 is mounted as follows: First, the pin plate 216 is loosely attached by means of threaded fasteners, which are not fully tightened down against the pin plate, to the support 50. Next, an alignment tool grasps the pins and moves the pin plate to a position which is aligned to the optical axis. Thereupon, the threaded fasteners are fully tightened, and the pin plate is locked in place. The reticle plate 206 whose reticle 89 is initially aligned to the optical axis is then mounted on the pin plate. The pin 220 is received in the notch 210. The pin 222 bears against the side 212. The reticle plate 206 is thus held in two orthogonal directions, and is fixed in place by a mounting screw 224 which is at least partially received in the cutout 214 and which is threaded into a threaded hole 226 formed in plate 216.

The same construction is provided for the other reticle 122 of reticle assembly 121, wherein a rectangular reticle carrier plate 228 is supported above a rectangular pin plate 230 on a top wall 232 of the rear support 50. The top wall 232 and the pin plate 230 have central aligned openings to permit light to pass therethrough along the minor axis. A pair of locating pins 234, 236 are mounted on pin plate 230. A mounting screw 238 fixes the position of the reticle plate 228.

Each reticle 89, 122 or, more properly, each reticle plate 206, 228, in which the respective reticle is received, may be quickly and easily removed from its mounted position, and replaced with another reticle plate carrying a different reticle, in the field, without compromising measurement accuracy, by simply loosening the respective mounting screw 224, 238, removing the respective reticle plate, positioning a new reticle plate into position against the respective locating pins 220 and 222; 234 and 236, and finally retightening the respective mounting screw 224, 238. Reticle 122 may advantageously be a dark field or bright field reticle; reticle 89 advantageously may be etched with a center dot, concentric circles, orthogonal axes, or with gradations or fiducial marks of any design.

Also shown in FIG. 9 is an alternate power supply for energizing the light source assembly 19. Rather than a set of batteries 129, 130, 131, 132, 133 for providing DC power which, of course, eliminated any electrical wires exteriorly of the instrument 10, an AC-to-DC converter of conventional design (not illustrated) and a power cable 240 may be provided outside the instrument and connected to an electrical wall outlet at which AC power is supplied. The cable 240 has a DC plug 242 inserted into a socket 244 provided on a side wall of a casing 246. The DC current and voltage is supplied to the light source assembly 19 as previously described. In order to control the magnitude of the power supplied, a potentiometer having an external knob 248 may be provided in the circuit path for either the battery-powered embodiment or the AC-powered embodiment, and is operative for varying the intensity of the light emitted by the bulb 95.

Also shown in FIG. 9 is a connector 250 exteriorly of the instrument 10 and having a shaft 252 which extends through the casing 246 and terminates in a threaded end 254 which is screwed into the fitting 145. The connector 250 serves to attach the casing 246 to the instrument.

Figure 8:
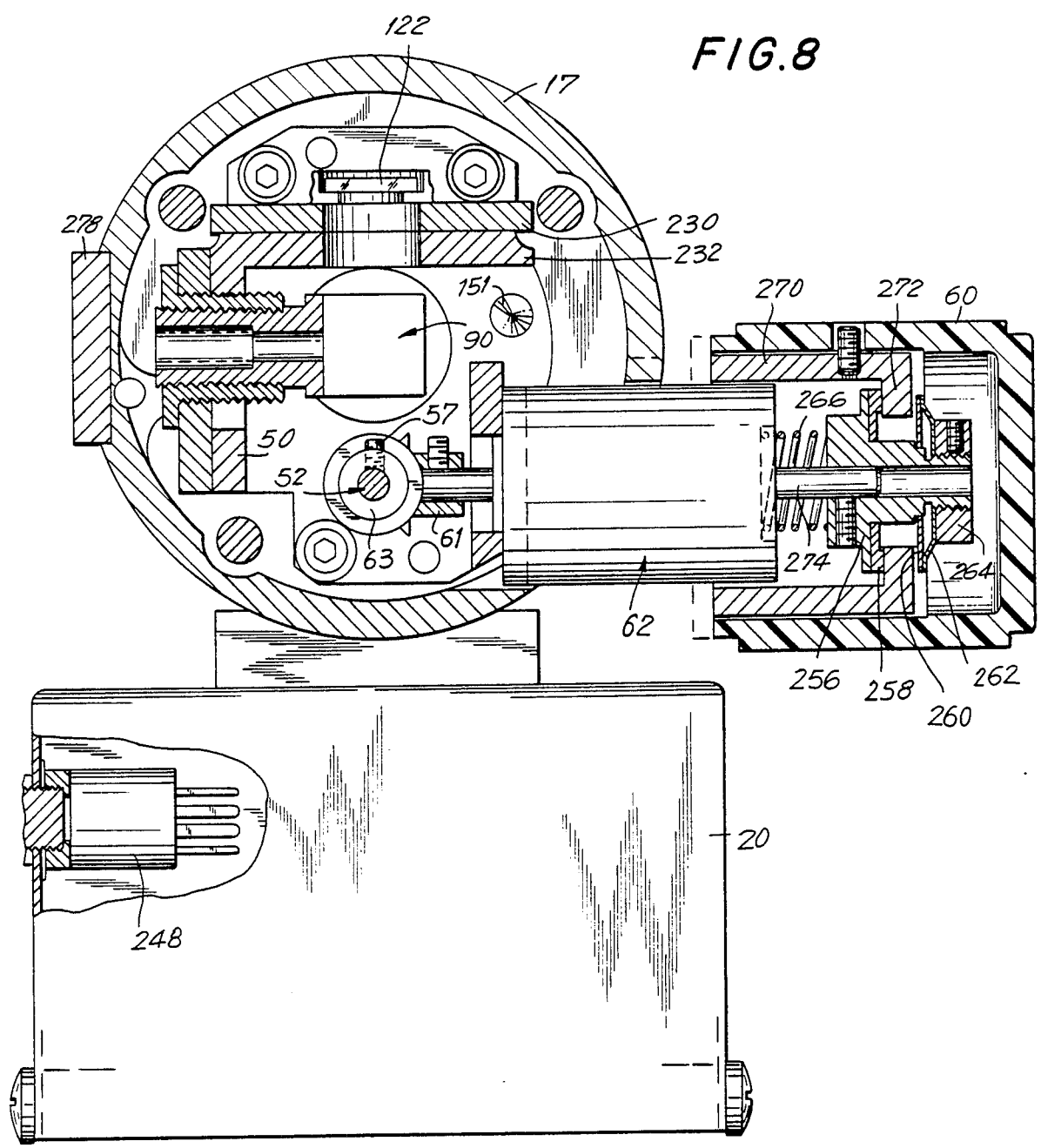
FIG. 8 is a vertical sectional view, showing one embodiment of a power supply in accordance with this invention.

Turning now to FIG. 8, the drive for moving the focusing lens assembly 37, as previously noted, includes a focusing knob 60, a transmission 62, and a pair of bevel gears 61, 63, the latter being fixed to the drive shaft 52 on which front and rear stop pins 59, 57 are respectively located. A hub 270 having a partition 272 is mounted within the knob 60. A slip clutch 256 is mounted on a gear shaft 274, and a shim 258 is mounted axially adjacent the clutch 256 against one side of the partition 272. A pair of washers 260, 262 are provided at the opposite side of the partition 272 and are held in place by a lock nut 264. A coil spring 266 surrounds the shaft 274 between the transmission 62 and the clutch 256, and urges the latter against the partition 272.

For each rotary movement of the knob 60, the drive shaft 52 is rotated. When the focusing lens assembly is at the ends of its range of movement, i.e. when the stop pins 59, 57 respectively abut against stop surfaces 71, 67 (see FIGS. 5 and 3), then the slip clutch is operative to slip if the user attempts to turn the knob further in a direction which would cause the respective stop pin to move more affirmatively against or past its respective stop surface. Thus, jamming of the stop pin and, in turn, of the entire focusing lens assembly, is prevented.

Another feature is embodied in the transmission 62 itself which is of the gear type and includes coarse adjustment means and fine adjustment means. The coarse adjustment means is operational to cause the drive shaft 52 to turn many times, e.g. fifteen times, for each turn of the knob 60. The fine adjustment means is made operational by first pushing in the knob 60 to the position shown in dashed lines in FIG. 8, and then by turning the knob 60, to cause the drive shaft 52 to turn much fewer times, e.g. two times, for each turn of the knob 60. The convertibility in easily changing between coarse and fine adjustment is a labor- and time-saving measure.

The user can rapidly and simply change transmissions and/or drives since they are non-permanently mounted on the instrument. Thus, in some applications, one may use a motor drive, rather than the aforementioned manual drive. Alternately, one may emply transmissions with different gear ratios.

Figure 12:
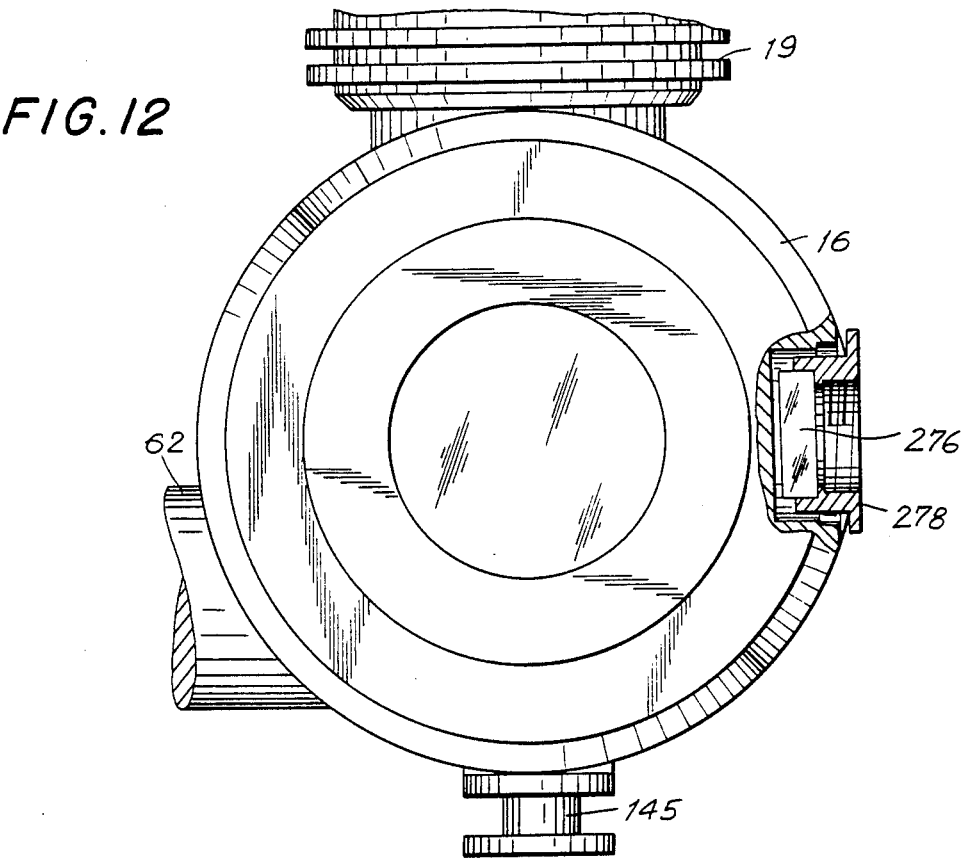
FIG. 12 is a partly broken-away rear end view of the telescope of FIG. 1.

Turning to FIG. 12, yet another advantageous feature resides in the provision of at least one optically flat reference mirror 276 in a plane parallel to and extending along the major axis. Preferably, the reference mirror is located at the exterior of the collar 16, and is mounted in a mirror holder 278 which is press-fitted into a bore formed in the collar 16. The reference mirror serves as a convenient reference point by which the position of the instrument 10 itself relative to other components of an optical system is determined. If two reference mirrors are desired, then the second is aligned at right angles to the first.

It will be understood that each of the elements described above, or two or more together, also may find a useful application in other types of constructions differing from the types described above.

While the invention has been illustrated and described as embodied in an autocollimating alignment telescope, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An autocollimating alignment telescope, comprising:
   (a) an elongated tubular barrel;
   (b) stationary objective lens means mounted in the barrel;
   (c) first reticle means mounted in the barrel away from the objective lens means;
   (d) movable focusing lens means mounted in the barrel away from the objective lens means and forming therewith an optical axis, said focusing lens means being axially movable among a range of alignment positions and a focused collimating position;
   (e) drive means operatively coupled to the focusing lens means for axially moving the same, in an alignment telescope mode of operation, to a selected one of the alignment positions in which the focusing lens means and the objective lens means focus light from at least one exterior target onto the first reticle means, said drive means being further operative for positioning the focusing lens means in the focused collimating position in an autocollimating mode of operation;

(f) energizable light source means mounted on the barrel and operative, when energized, for emitting light in the autocollimating mode of operation;

(g) second reticle means mounted on the barrel adjacent the light source means;

(h) means for directing light emitted from the energized light source means through the second reticle means, the focusing lens means in the collimating position, and the objective lens means to an exterior light-reflecting target which reflects the emitted light impinging thereon, at least a portion of the light reflected off the light-reflecting target being focused by the objective lens means and the focusing lens means in the collimating position onto the first reticle means in the autocollimating mode of operation;

(i) eyepiece means mounted on the barrel, and operative for enabling a viewer to view the light focused on the first reticle means in either mode of operation; and (j) automatic switching means operatively coupled to the light source means and the focusing lens means for automatically energizing the light source means when the focusing lens means is moved by the drive means to the collimating position, and for automatically deenergizing the light source means when the focusing lens means is moved by the drive means to any one of the alignment positions, whereby the emitted light is automatically lit during the autocollimating mode of operation and is automatically extinguished during the alignment telescope mode of operation.

2. The autocollimating alignment telescope as recited in claim 1; and further comprising a stand on which the barrel is supported above a generally horizontal support surface.

3. The autocollimating alignment telescope as recited in claim 1, wherein the stationary objective lens means includes a stationary objective lens cell fixedly mounted within the barrel, and having a pair of objective lens elements axially spaced apart from, and fixed relative to, each other.

4. The autocollimating alignment telescope as recited in claim 1, wherein the movable focusing lens means includes a traveling focusing lens cell mounted for axial movement within and along the barrel, and having a pair of focusing lens elements axially spaced apart from, and fixed relative to, each other.

5. The autocollimating alignment telescope as recited in claim 4, wherein the traveling cell includes a threaded passage and a guide passage, both radially offset from the optical axis and extending generally parallel to the optical axis through the traveling cell; and wherein the drive means includes a threaded drive shaft elongated along a shaft axis and threadedly engaging the threaded passage, and a guide shaft stationarily mounted in the barrel and extending through the guide passage.

6. The autocollimating alignment telescope as recited in claim 5, wherein the drive means includes a manually-turnable handle, and a transmission means arranged between the handle and the traveling cell for axially moving the same in response to manual turning of the handle, said transmission means being coupled to the drive shaft for turning the same about the shaft axis within the threaded passage while the stationary guide shaft extends through the guide passage and prevents turning of the traveling cell about the shaft axis.

7. The autocollimating alignment telescope as recited in claim 6, wherein the transmission means includes a coarse adjustment means for turning the drive shaft a relatively greater number of times about the shaft axis for each turn of the handle, and a fine adjustment means for turning the drive shaft a relatively fewer number of times about the shaft axis for each turn of the handle.

8. The autocollimating alignment telescope as recited in claim 6, wherein the drive means includes a first and a second abutment in the path of axial movement of a first and a second part of the traveling cell to define a first and a second end-limiting position when a respective abutment engages a respective part of the traveling cell, and wherein the transmission means includes slip clutch means operative for preventing a respective part of the traveling cell from jamming against and moving past the respective abutment with which it is engaged in a respective end-limiting position.

9. The autocollimating alignment telescope as recited in claim 8, wherein each first and second part of the traveling cell includes a bracket having a stop surface adjustably mounted on the traveling cell, and wherein the first and second abutments include transversely-extending pins axially spaced apart from each other and mounted for joint movement on the drive shaft, each pin being engageable with a respective stop surface in a respective end-limiting position.

10. The autocollimating alignment telescope as recited in claim 1, wherein the eyepiece means includes an eyepiece housing detachably mounted on the barrel at a first location, and wherein the light source means includes a light source housing detachably mounted on the barrel at a second location; and further comprising housing mounting means for interchangeably mounting either one of the housings at either one of the locations.

11. The autocollimating alignment telescope as recited in claim 10, wherein the housing mounting means includes a pair of internally-threaded openings, both having the same pitch and being located on the barrel, one of the threaded openings extending axially along the optical axis, and the other of the threaded openings extending radially of the optical axis; and wherein the housings have external threads, both having the same pitch as that of the threaded openings, each external thread threadedly engaging a selected one of the internally-threaded openings.

12. The autocollimating alignment telescope as recited in claim 1, wherein the first reticle means includes a set of first reticle plates, each detachably mounted on the barrel at a first predetermined position, and wherein the second reticle means includes a set of second reticle plates, each detachably mounted on the barrel at a second predetermined position; and further comprising reticle mounting means for interchangeably mounting a selected one of the set of first reticle plates at the first predetermined position, and for interchangeably mounting a selected one of the set of second reticle plates at the second predetermined position.

13. The autocollimating alignment telescope as recited in claim 12, wherein the reticle mounting means includes a pair of stationary positioning pins for each reticle plate, one of the positioning pins engaging the respective plate for fixedly positioning the same in a first direction perpendicularly to the optical axis, and the other of the positioning pins engaging the same respective plate for fixedly positioning the same in a second direction perpendicularly to the first direction.

14. The autocollimating alignment telescope as recited in claim 12, wherein each reticle plate has a notch formed in one of its sides, and wherein the reticle mounting means includes a pair of stationary positioning pins for each reticle plate, one of the positioning pins being received in the notch, and the other of the positioning pins being engaged with another of the sides of the respective reticle plate.

15. The autocollimating alignment telescope as recited in claim 12, wherein the reticle mounting means includes means for positioning each reticle plate in its predetermined position, and means for threadedly securing each reticle plate after positioning of the same.

16. The autocollimating alignment telescope as recited in claim 1, wherein the directing means includes a beam splitter located on the optical axis, and operative for directing light to pass therethrough along the optical axis and radially of the same.

17. The autocollimating alignment telescope as recited in claim 1, wherein the light source means includes a bulb, and a power supply detachably mounted on the barrel and electrically connected to the bulb for supplying electrical power thereto.

18. The autocollimating alignment telescope as recited in claim 17, wherein the power supply includes a self-contained battery pack for supplying DC voltage and current to the bulb.

19. The autocollimating alignment telescope as recited in claim 17, wherein the power supply includes a cable for delivering DC voltage and current.

20. The autocollimating alignment telescope as recited in claim 17, wherein the light source means includes means for regulating the magnitude of the electrical power.

21. The autocollimating alignment telescope as recited in claim 1, wherein the automatic switching means includes a pair of electrical contacts operatively connected to the light source means and spaced apart from each other in an open state during the alignment telescope mode of operation, and an actuator mounted for joint movement on the focusing lens means and operative when the latter has been moved to the collimating position for moving at least one of the electrical contacts into engagement with the other of the electrical contacts in a closed state.

22. The autocollimating alignment telescope as recited in claim 21, wherein the focusing lens means includes a traveling lens cell having a rear end portion, and wherein the actuator is a rod mounted on the rear end portion and extending rearwardly along a rod axis that is radially offset from, and extends generally parallel to, the optical axis.

23. The autocollimating alignment telescope as recited in claim 21, wherein the barrel has a port located at one end region of the barrel, and wherein the barrel includes a cover mounted at the other end region of the barrel; and wherein the mounted cover positions the other electrical contact to a spaced position relative to the one electrical contact in the open state.

24. The autocollimating alignment telescope as recited in claim 21; and further comprising bypass means for maintaining the electrical contacts in the closed state at all times including during the alignment telescope mode of operation.

25. The autocollimating alignment telescope as recited in claim 1; and further comprising an alignment mirror mounted on the barrel and having a light-reflecting surface positioned in a plane which is radially offset from the optical axis, and extends in a first direction parallel to the optical axis, and in a second direction perpendicularly to the first direction.

26. The autocollimating alignment telescope as recited in claim 1; and further comprising an indicator for providing an indication when the focusing lens means is in the collimating position.

27. The autocollimating alignment telescope as recited in claim 26, wherein the indicator is a light emitting diode electrically connected to the light source means and operative to light up in the autocollimating mode of operation.

28. An autocollimating alignment telescope, comprising: p1 (a) an elongated tubular barrel;
  (b) stationary objective lens means mounted in the barrel;
  (c) first reticle means mounted in the barrel away from the objective lens means;
  (d) movable focusing lens means mounted in the barrel away from the objective lens means and forming therewith an optical axis, said focusing lens means being axially movable among a range of alignment positions and a focused collimating position;
  (e) drive means operatively coupled to the focusing lens means for axially moving the same, in an alignment telescope mode of operation, to a selected one of the alignment positions in which the focusing lens means and the objective lens means focus light from at least one exterior target onto the first reticle means, said drive means being further operative for positioning the focusing lens means in the focused collimating position in an autocollimating mode of operation;
  (f) energizable light source means including a light source housing detachably mounted on the barrel at a first location and operative, when energized, for emitting light in the autocollimating mode of operation;
  (g) second reticle means mounted on the barrel adjacent the light source means;
  (h) means for directing light emitted from the energized light source means through the second reticle means, the focusing lens means in the collimating position, and the objective lens means to an exterior light-reflecting target which reflects the emitted light impinging thereon, at least a portion of the light reflected off the light-reflecting target being focused by the objective lens means and the focusing lens means in the collimating position onto the first reticle means in the autocollimating mode of operation;
  (i) eyepiece means including an eyepiece housing detachably mounted on the barrel at a second location, and operative for enabling a user to view the light focused on the first reticle means in either mode of operation;
  (j) means for energizing the light source means in the autocollimating mode of operation; and
  (k) housing mounting means for interchangeably mounting either one of the housings at either one of the locations.

29. An autocollimating alignment telescope, comprising:
(a) an elongated tubular barrel;
(b) stationary objective lens means mounted in the barrel;
(c) first reticle means including a set of reticle plates, each detachably mounted on the barrel at a first predetermined position away from the objective lens means;
(d) movable focusing lens means mounted in the barrel away from the objective lens means and forming therewith an optical axis, said focusing lens means being axially movable among a range of alignment positions and a focused collimating position;
(e) drive means operatively coupled to the focusing lens means for axially moving the same, in an alignment telescope mode of operation, to a selected one of the alignment positions in which the focusing lens means and the objective lens means focus light from at least one exterior target onto the first reticle means, said drive means being further operative for positioning the focusing lens means in the focused collimating position in an autocollimating mode of operation;
(f) energizeable light source means mounted on the barrel and operative, when energized, for emitting light in the autocollimating mode of operation;
(g) second reticle means including a set of second reticle plates, each detachably mounted on the barrel at a second predetermined location adjacent the light source means;
(h) means for directing light emitted from the energized light source means through the second reticle means, the focusing lens means in the collimating position, and the objective lens means to an exterior light-reflecting target which reflects the emitted light impinging thereon, at least a portion of the light reflected off the light-reflecting target being focused by the objective lens means and the focusing lens means in the collimating position onto the first reticle means in the autocollimating mode of operation;
(i) eyepiece means mounted on the barrel, and operative for enabling a user to view the light focused on the first reticle means in either mode of operation;
(j) means for energizing the light source means in the autocollimating mode of operation; and
(k) reticle mounting means for interchangeably mounting a selected one of the set of first reticle plates at the first predetermined position, and for interchangeably mounting a selected one of the set of second reticle plates at the second predetermined position.

30. An autocollimating alignment telescope, comprising:
(a) an elongated tubular barrel;
(b) stationary objective lens means mounted in the barrel;
(c) first reticle means mounted in the barrel away from the objective lens means;
(d) movable focusing lens means mounted in the barrel away from the objective means and forming therewith an optical axis, said focusing lens means being axially movable among a range of alignment positions and a focused collimating position;
(e) drive means operatively coupled to the focusing lens means for axially moving the same, in an alignment telescope mode of operation, to a selected one of the alignment positions in which the focusing lens means and the objective lens means focus light from at least one exterior target onto the first reticle means, said drive means being further operative for positioning the focusing lens means in the focused collimating position in an autocollimating mode of operation;
(f) energizeable light source means mounted on the barrel and operative, when energized, for emitting light in the autocollimating mode of operation;
(g) second reticle means mounted on the barrel adjacent the light source means;
(h) means for directing light emitted from the energized light source means through the second reticle means, the focusing lens means in the collimating position, and the objective lens means to an exterior light-reflecting target which reflects the emitted light impinging thereon, at least a portion of the light reflected off the light-reflecting target being focused by the objective lens means and the focusing lens means in the collimating position onto the first reticle means in the autocollimating mode of operation;
(i) eyepiece means mounted on the barrel, and operative for enabling a user to view the light focused on the first reticle means in either mode of operation;
(j) means for energizing the light source means in the autocollimating mode of operation; and
(k) said drive means including a manually-turnable handle and a transmission means between the handle and the movable focusing lens means, said transmission means having a coarse adjustment means for moving the focusing lens means through a relatively greater distance along the optical axis for each turn of the handle, and a fine adjustment means for moving the focusing lens means through a relatively smaller distance along the optical axis for each turn of the handle.

31. An autocollimating alignment telescope, comprising:
(a) an elongated tubular barrel;
(b) stationary objective lens means mounted in the barrel;
(c) first reticle means mounted in the barrel away from the objective lens means;
(d) movable focusing lens means mounted in the barrel away from the objective lens means and forming therewith an optical axis, said focusing lens means being axially movable among a range of alignment positions, a focused collimating position, and a pair of end-limiting positions;
(e) drive means operatively coupled to the focusing lens means for axially moving the same, in an alignment telescope mode of operation, to a selected alignment position in which the focusing lens means and the objective lens means focus light from at least one exterior target onto the first reticle means, said drive means being further operative for positioning the focusing lens means on the focused collimating position in an autocollimating mode of operation;
(f) energizeable light source means mounted on the barrel and operative, when energized, for emitting light in the autocollimating mode of operation;
(g) second reticle means mounted on the barrel adjacent the light source means;
(h) stop means for stopping the focusing lens means in either one of the end-limiting positions;

(i) means for directing light emitted from the energized light source means through the second reticle means, the focusing lens means in the collimating position, and the objective lens means to an exterior light-reflecting target which reflects the emitted light impinging thereon, at least a portion of the light reflected off the light-reflecting target being focused by the objective lens means and the focusing lens means in the collimating position onto the first reticle means in the autocollimating mode of operation;

(j) eyepiece means mounted on the barrel, and operative for enabling a user to view the light focused on the first reticle means in either mode of operation;

(k) means for energizing the light source means in the autocollimating mode of operation; and (l) anti-jam means for preventing the focusing lens means from jamming in either one of the end-limiting positions.

* * * * *